US006547314B1

(12) United States Patent
Rasmussen

(10) Patent No.: US 6,547,314 B1
(45) Date of Patent: Apr. 15, 2003

(54) CAMPER ANCHORING AND/OR POSITIONING SYSTEM

(75) Inventor: C. Martin Rasmussen, Fruit Heights, UT (US)

(73) Assignee: Happijac Company, Kaysville, UT (US)

( * ) Notice: Subject to any disclaimer, the term of this patent is extended or adjusted under 35 U.S.C. 154(b) by 0 days.

(21) Appl. No.: 09/637,179

(22) Filed: Aug. 11, 2000

(51) Int. Cl.[7] .............................................. B60R 15/00
(52) U.S. Cl. ..................................... 296/167; 296/35.3
(58) Field of Search ............................... 296/156, 164, 296/167, 35.3; 414/498

(56) References Cited

U.S. PATENT DOCUMENTS

| 3,368,785 | A | * | 2/1968 | Weiler | 296/167 |
| 3,655,234 | A | * | 4/1972 | Kirschbaum | 296/167 |
| 3,719,382 | A | * | 3/1973 | Palm | 296/167 |
| 3,782,774 | A | * | 1/1974 | Sturek | 296/167 |
| 3,792,900 | A | * | 2/1974 | Bugh | 296/167 |
| 4,103,959 | A | * | 8/1978 | Whiting et al. | 296/167 |
| 5,833,302 | A | * | 11/1998 | Kerr | 296/167 |
| 6,106,052 | A | * | 8/2000 | Shaw | 296/167 |
| 6,145,920 | A | * | 11/2000 | Rasmussen | 296/167 |

FOREIGN PATENT DOCUMENTS

EP 0496309 A1 * 7/1992 ................. 414/498

* cited by examiner

Primary Examiner—D. Glenn Dayoan
Assistant Examiner—Patricia L. Engle
(74) Attorney, Agent, or Firm—Workman Nydegger Seeley

(57) ABSTRACT

A system for anchoring and/or positioning a camper within a bed of a truck. The system comprising an anchoring assembly, a positioning assembly, and tie-down means for interconnecting the camper with said anchoring assembly. The anchoring assembly is attached to the bed of the truck and includes a mounting bracket, guide plate, stabilizing bar, and support bracket. The mounting bracket is configured to be mountable to the bed of the truck. The guide plate is connected to the mounting bracket and is configured to receive the stabilizing bar therein. The stabilizing bar is configured to connect two or more guide plates. A support bracket is attached to a load bearing member of the truck below the bed of the truck. A positioning assembly is also mounted in the bed of the truck. The positioning assembly is configured to guide the camper within the bed of the truck, while preventing lateral movement of the camper during movement of the truck. A tie-down assembly interconnects the camper with the anchor assembly.

35 Claims, 9 Drawing Sheets

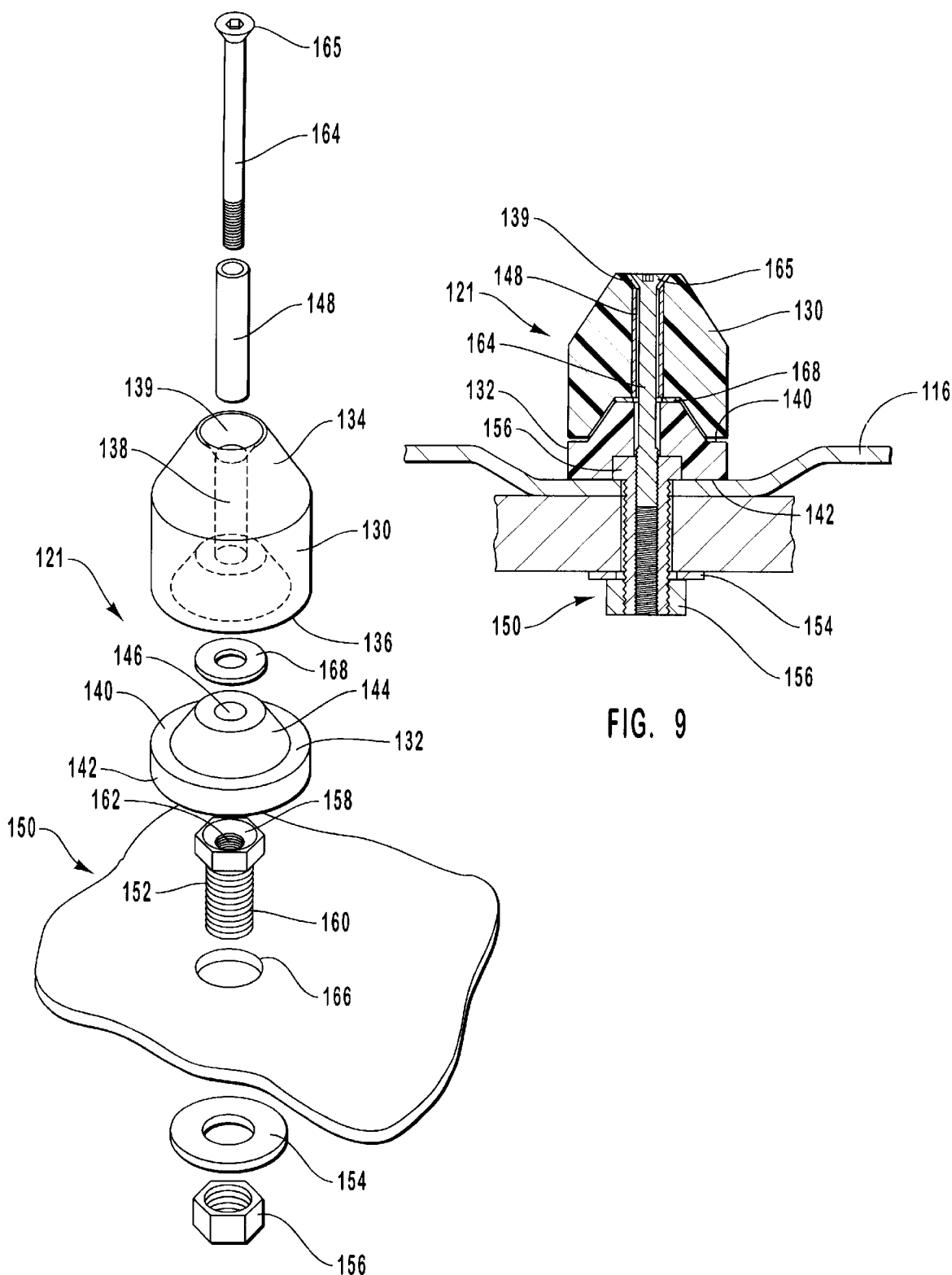

CAMPER ANCHORING AND/OR POSITIONING SYSTEM

BACKGROUND OF THE INVENTION

1. The Field of the Invention

The present invention generally relates to a device for attaching objects within a bed of a vehicle. More specifically, the present invention relates to a system, with associated methods and apparatus, for anchoring and/or positioning a camper within the bed of a truck.

2. The Relevant Technology

In recent years, developing trends have lead to the creation of increasingly larger vehicles, such as larger and more powerful pickup trucks. Truck power and dimensions have increased, thereby allowing individuals to move heavier loads over greater distances. Individuals may move a greater quantity of work equipment and supplies, while also towing more recreational equipment and materials. Specifically, with the increased towing power available with newer pickup trucks, individuals may tow larger boats, trailers, and the like. Furthermore, with the ability to move larger cargo loads, many individuals are turning to larger campers that may be loaded within the bed of a pickup truck for their recreational needs.

Typically, a bed mounted camper provides an individual with a secure and mobile dwelling so that the individual, and their family and friends, may enjoy the "outdoors" without the need to be tied to one particular fixed temporary dwelling, such as a motel or hotel. The use of a camper, therefore, gives many individuals a sense of freedom to explore the natural beauties of the world, while limiting the need to "rough it". In this way, individuals are able to maintain some of normal amenities associated with their homes, such as cooking appliances, heating, sleeping accommodation, running water, and the like, while experiencing some aspects of "roughing it" in the great outdoors.

Bed mountable campers come in a variety of sizes ranging from smaller lightweight campers to the larger heavier campers that weigh approximately 5000 lbs or more. Normally, conventional tie-down assemblies are used to secure a bed mountable camper within the bed of the vehicle. Each tie-down assembly typically includes a turnbuckle, or similar device, which is attached to the camper. In general, each tie-down assembly extends from the truck to a connector point on the camper, typically at the camper's corners. By positioning the tie-down assemblies in close proximity to the corners of the camper, greater stability is given to the camper which reduces the road and wind action that acts to urge the camper away from the truck bed as the truck travels along a road.

Although the positioning of the tie-down assemblies alleviates some of the effects of road and wind action, generally, the camper may still move laterally or side-to-side within the bed of the truck. Lateral movement of the camper may result in significant damage to the truck. For example, since the inclusion of a camper within the truck bed raises the center of gravity of the truck-camper combination, if the camper is allowed to move laterally, the wind and road action may cause the camper to tilt causing significant torque and force moments on the tie-down assembly. Such lateral movement, and associated torque and force moments, may further result in the camper becoming at least partially disconnected from the truck and damaging the sides of the truck.

Various types of tie-down assemblies are known within the art that attempt to combat the force and torque moments that are applied on the camper by road and wind action. One type of available tie-down assembly, having an anchor member, which is secured to the bed of a truck, and a selectively removable, self-tension bracket member coupling with a turnbuckle attached to the camper, is available. The bracket member is rotatable about the anchor member and can be removed in one predetermined position but cannot become detached when a tensioning force is being applied through the turnbuckle. This type of tie-down assembly helps to reduce the effects of torque and force moments on the tie assembly. It is also important, however, that the tie-down assembly be securely anchored to the body of the truck, specifically to one or more of the load bearing members of the truck, by an anchoring device or assembly. The configuration of conventional tie-down assemblies is unable to meet this need.

There are numerous anchoring assemblies that may be used to retain a camper within the bed of a truck. For example, one type of anchoring assembly uses two front-end tie-down assemblies that are anchored near each side of the front wall of the bed of a truck. The mounting bracket for the front and rear tie-down assemblies usually include a substantially flat plate with a number of threaded holes therethrough. The plate is positioned between the rear wall of the cab and the front wall of the truck bed and extends a short distance beyond the sides of the truck bed. A number of bolts are passed through the front wall of the truck bed and are matted within the threaded holes in the plate. The extension of the plate beyond the sides of the truck bed allows a turnbuckle or similar device to be attached thereto, and hence a camper may be connected to the bed of a truck. The rear tie-down assemblies of the anchoring assembly are typically anchored at each sidewall of the bed of a truck near the tailgate or at each side of the rear bumper. These types of anchoring devices provide horizontal and vertical securing of the tie-down assembly.

Another type of anchoring assembly uses two elongate anchoring members that are sized to extend from one side of a truck to the other. The anchoring members include flanges that connect to the truck frame as the anchoring members are located beneath the truck bed and beneath the outer walls of the truck bed. In this type of anchoring assembly, therefore, each anchoring member is connected to the frame of the truck beneath the truck bed while allowing the ends of each anchoring member to extend beyond the sides of the truck. Located at the ends of each anchoring member is a hook or eyelet that allows a turnbuckle to connect the camper to the anchoring member. In this way the camper is retained within the truck bed. This type of anchoring assembly, however, has many problems.

As discussed above, the anchoring member extends a distance beyond the sides of the truck so that attachment of the turnbuckle between the camper and the anchoring member does not damage the exterior of the truck. As each turnbuckle is tightened to retain the camper within the truck bed, however, the portions of the anchoring member that extend from the truck frame beyond the sides of the truck begin to flex under the applied force. The tightening of the turnbuckle applies a significant torque moment to the anchoring members. Over time, the anchoring members may bend, become incapable of securely retaining the camper within the truck bed, or break.

To attempt to overcome some of these problems, elongate anchoring members are fabricated from larger elements that cause a resulting increase in the overall weight of the anchoring members. The increased weight makes the anchoring member more difficult to install and remove and adds to the purchase cost of the anchoring member. Furthermore, in a number of newer trucks, the truck's gasoline tank is positioned between the elements of the truck frame and extends below the lower surfaces of the truck frame. Consequently, the anchoring members described above may not connect to the truck frame at the desired points, thereby preventing the camper from being securely contained within the truck bed.

Another type of anchoring assembly attempts to solve the above-described problems with the elongated anchoring member by having two separate anchor members, one for each side of the truck. Each anchoring member includes a bracket that may be secured to the truck frame and an elongate member that extends beyond the side of the truck. Extending from the elongate member towards the underside of the truck bed is a bracing member that provides extra rigidity to the anchoring member. The bracing member limits the torque moments applied to the elongate member as a turnbuckle, connected between the end of the elongate member and the camper, is tightened. Unfortunately, as the turnbuckle is tightened the bracing member is forced upward toward the underside of the bed of the truck, and in some situations, tends to detach the bed from the truck frame. In this case, the anchoring assembly typically is fabricated from large elements that may have sufficient strength to resist the torque moments applied by the turnbuckle. Again, this results in heavier anchoring assemblies that are difficult to install and remove, and expensive to purchase.

In addition to the above-recited problems, none of the above-described anchoring assemblies assist with positioning the camper during installation. During installation, typically, the camper is loaded into the bed of the truck using a crane, forklift, or by reversing the truck bed under an elevated camper. No matter the manner by which the camper is located within the truck bed, the camper must be centered within the bed of the truck so as to displace the camper's weight accurately and evenly over the rear axle of the truck. This procedure may take a great deal of time, considering the weight of the camper and the equipment used to install the camper. In an attempt to assist an individual with positioning the camper, various types of aids have been used to align the camper in the correct position. One common example are pieces of wood. Unfortunately, the pieces of wood may move during installation and cause inaccurate positioning of the camper. Additionally, a number of large pieces of wood are difficult to store for future use. Alternatively, an individual may mount a number of triangular shaped brackets in the truck bed to guide the camper into the desired location. The triangular shaped brackets are typically fixed in place and may not be removed. Consequently, the triangular shaped brackets impair the usability of the truck bed when the camper is removed since they extend upwardly away from the truck bed and interfere with any object that is to be placed therein.

It would be an advance, therefore, to provide a system, methods, and associated assemblies to both anchor and position a camper securely within a truck bed. Furthermore, although some of the previously described anchoring or tie-down assemblies reduce the lateral motion of the camper caused by road or wind action, none of the above-described assemblies substantially completely eliminate lateral movement of the camper caused by road and wind action. Additionally, it would be an advance to provide a system that is lightweight, easy to use, and securely retains and positions a camper within a truck bed while substantially allowing the truck bed to be used, as needed when the anchoring and positioning assemblies are not required and the camper is removed from the bed of the truck. Furthermore, it would be an advance to provide a system that both securely retains a camper within a truck bed, while accurately positioning the camper in the correct location of the truck bed as the camper is installed.

SUMMARY AND OBJECTS OF THE INVENTION

It is an object of the present invention to provide a system that assists with positioning a camper within a truck bed while limiting the lateral movement of the camper under the influence of wind and road action.

Another object of the present invention is to provide a system for securely anchoring an object within a bed of a truck in an easy and effective manner.

It is another object of the present invention to provide a system that allows the truck bed to be effectively used when the camper is removed from the truck bed.

Still yet another object of the present invention is to provide a system that securely attaches to one or more load bearing members of the truck while limiting the force and/or torque moments that may be applied to the system for anchoring and/or positioning a camper within the bed of a truck during use.

An additional object of the present invention is to provide a system that is capable of anchoring a camper within the bed of a truck, while also guiding the camper within the bed of the truck during installation of the camper.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

To achieve the foregoing objects, and in accordance with the invention as embodied and broadly described herein, a system for anchoring and/or positioning a camper within a bed of a truck having a load bearing member is provided. The system includes an anchoring assembly attached to the truck, a positioning assembly also connected to the truck, and a tie-down assembly to interconnect the camper with the anchoring assembly. The anchoring assembly is configured to be mountable to the load bearing member of the truck through the bed of the truck. The anchoring assembly includes a mounting bracket, a guide plate, and a support bracket that are attached one to another by way of one or more fasteners and protrusions. The guide plate is configured to receive a stabilizing bar therein. Disposed through the guide plate are a number of holes that allow the guide plate to be mounted to the bed of the truck, while allowing the support bracket to be mounted to the guide plate. The support bracket is configured to be mountable to the load bearing member of the truck through the bed of the truck.

The system for anchoring and positioning a camper within a bed of a truck includes a positioning assembly that is configured to guide the camper within the bed of the truck during installation of the camper, while also preventing lateral movement of the camper when the camper is in use. The positioning assembly includes a front roller assembly and a rear roller assembly. The front roller assembly includes a bracket that is configured to mount to the guide plate of the anchoring assembly, or alternatively to the stabilizing bar. A roller body is rotatably attached to the bracket. The roller body has a generally tapered first end that guides the camper into the correct position within the bed of the truck during installation. The rear roller assembly includes a roller body, a fixed body, and a locking assembly. The roller body has a similar configuration to the roller body of the front roller assembly. The fixed body is rotatably engaged with the front roller assembly and is mountable to the bed of the truck. The locking assembly is configured to mount the roller body and the fixed body to the bed of the truck.

The tie-down assembly includes an elongated turnbuckle having a first end attached to the camper and a second end that is connected to the mounting bracket of the anchoring assembly.

It will be appreciated that the system or anchoring and/or positioning a camper of the present invention may be securely mounted to the load bearing member of the truck through the bed of the truck in a similar manner as that described above. In particular, the configuration of the system for anchoring and/or positioning a camper within the bed of a truck of the present invention substantially eliminates the torque moments that are traditionally applied to existing anchoring assemblies that are mountable below the bed of the truck.

BRIEF DESCRIPTION OF THE DRAWINGS

In order that the manner in which the above recited and other advantages and features of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 8 is an exploded perspective view of one embodiment of a rear roller assembly in one embodiment of a positioning assembly.

FIG. 9 is a cross-sectional elevation view of one embodiment of a roller of the rear roller assembly of FIG. 8.

DETAILED DESCRIPTION OF THE PREFERRED EMBODIMENTS

The present invention is related to a system that may be used to secure an object in a bed of a truck. More specifically, the system for anchoring and/or positioning a camper within the bed of a truck of the present invention allows a camper to be securely anchored in a truck bed, thereby preventing lateral movement of the camper. Additionally, the configuration of the system substantially eliminates torque moments that may be applied to the load bearing members of the truck from road and wind action as the vehicle is moving. The system of the present invention is easy to install, lightweight, and assists with the accurate positioning of the camper along the central axis of the bed of the truck, so that the weight of the camper is effectively distributed throughout the bed of the truck. Furthermore, the system for anchoring and/or positioning a camper within the bed of a truck of the present invention may be used on a variety of trucks, without the need for numerous different or interchangeable parts depending upon the vehicle type on which the system for anchoring and/or positioning a camper within the bed of a truck is intended to be used. Also, the system of the present invention is modular, in that parts of the system may be eliminated when not required, or added at any time to provide greater stability to the camper.

Figure 1:
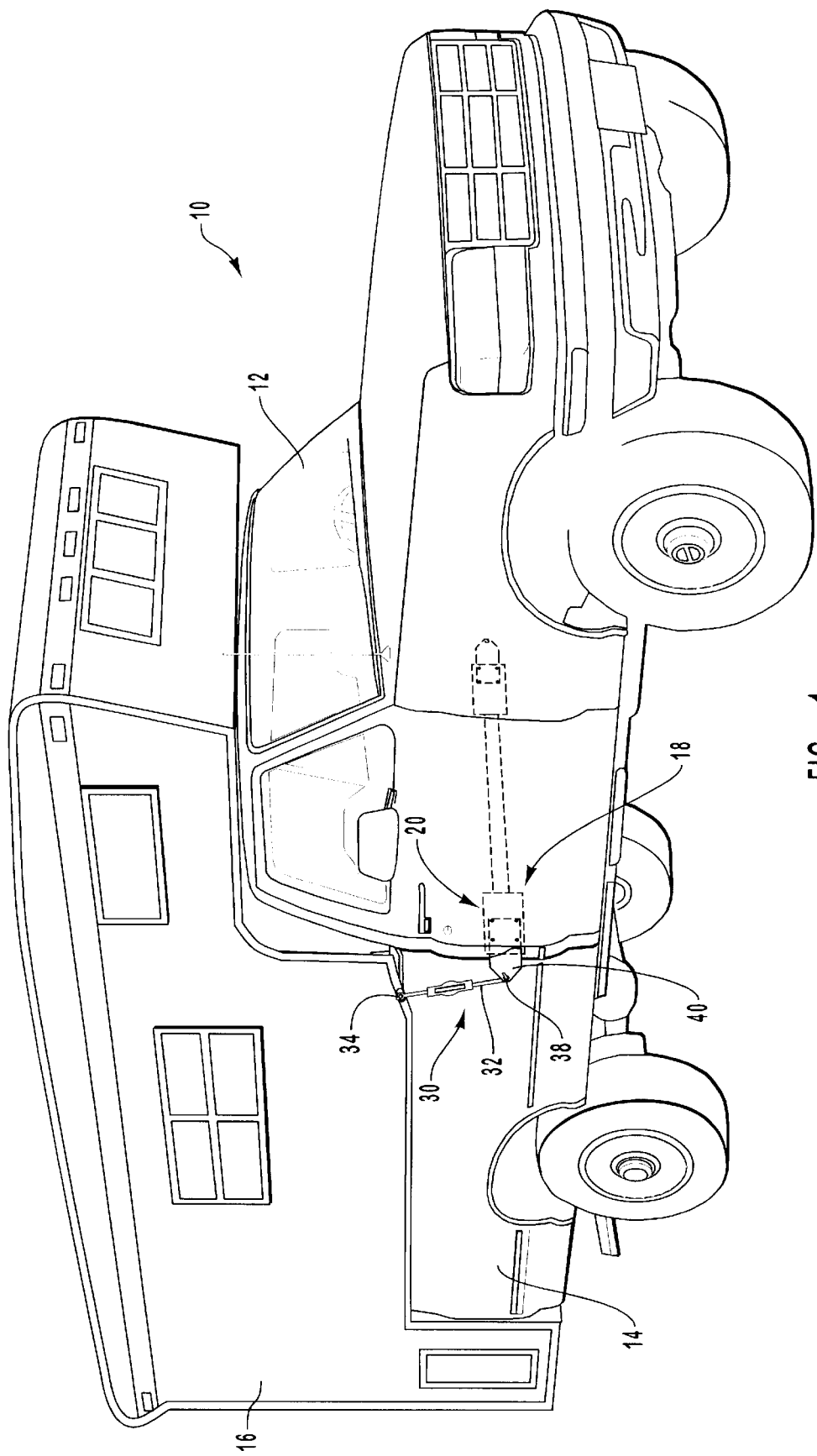
FIG. 1 is a perspective view of one embodiment of a truck with a camper mounted thereon using one embodiment of a system for anchoring and/or positioning a camper within the bed of a truck.

FIG. 1 depicts a truck 10 with a cab 12 and a truck bed 14 that supports a camper 16. As generally shown in FIG. 1, a system 18 for anchoring and/or positioning a camper 16 within truck bed 14 is used to securely hold and anchor camper 16 in truck bed 14. System 18 is configured to substantially reduce the torque moments that are applied to the elements of system 18 for anchoring and/or positioning camper 16 within truck bed 14 caused by installation and/or wind action while truck 10 is moving. Further, the inventive configuration of system 18 for anchoring and/or positioning camper 16 within truck bed 14 reduces the forces and torque moments acting on the truck bed 14 of truck 10.

Figure 2:
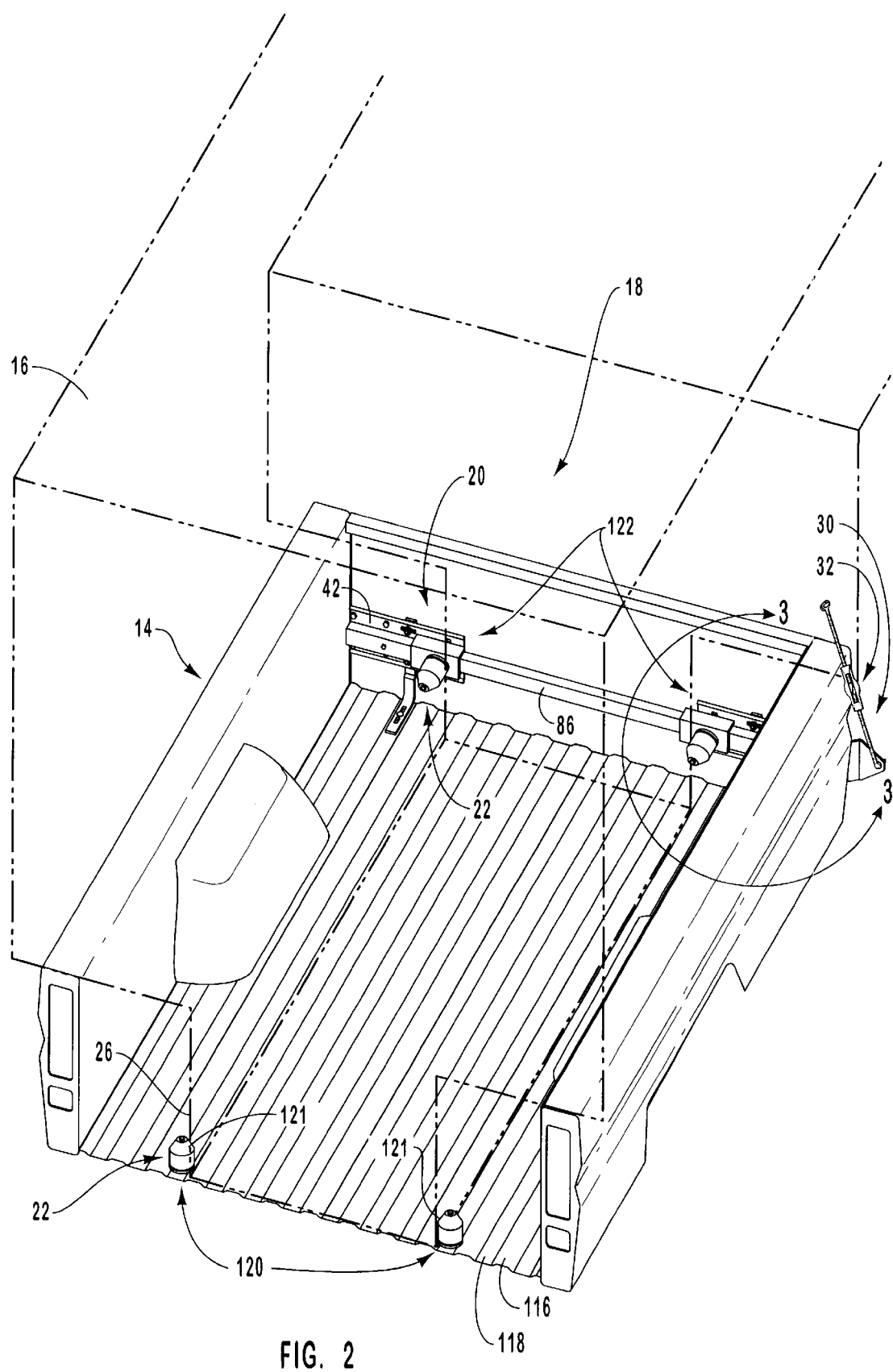
FIG. 2 is a perspective view of one embodiment of a truck bed with one embodiment of a system for anchoring and/or positioning a camper within the bed of a truck.

Referring to FIG. 2, in one embodiment, system 18 for anchoring and/or positioning camper 16 within truck bed 14 includes an anchoring assembly 20 and optional positioning assemblies 22. System 18 will be described as utilizing both anchoring assembly 20 and positioning assemblies 22, although, one skilled in the art will appreciate that system 18 for anchoring and/or positioning camper 16 within truck bed 14 may only use one of anchoring assembly 20 and positioning assembly 22. Further, although FIG. 2 depicts system 18 as including two positioning assemblies 22, it will be appreciated that various other numbers of positioning assemblies 22 are possible. By way of example and not limitation, only one positioning assembly 22 may be used.

As shown in FIG. 2, system 18 for anchoring and/or positioning camper 16 within truck bed 14 also includes a tie-down means for interconnecting camper 16 with anchoring assembly 20. Structure capable of performing the function of such a tie-down means, as shown by way of example and not by limitation in FIGS. 1 and 2, comprises a tie-down assembly 30. In one embodiment, tie-down assembly 30 comprises a turnbuckle 32 that spans substantially the entire distance between an attachment piece 34 on camper 16 and anchoring assembly 20.

Figure 3:
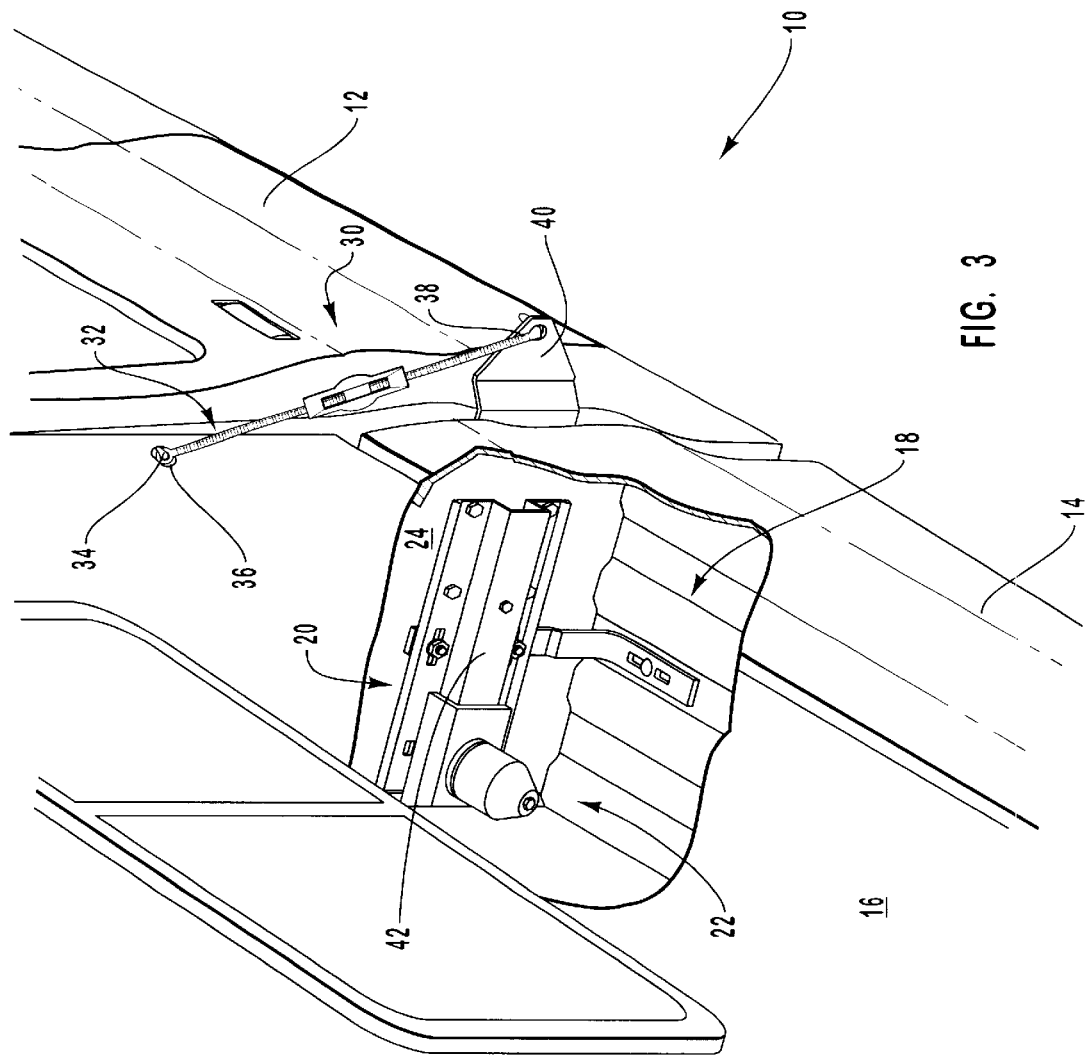
FIG. 3 is a partial breakaway perspective view of a portion of the system for anchoring and/or positioning a camper within the bed of a truck of FIG. 2.

In one embodiment illustrated in FIG. 3, turnbuckle 32 has a first end 36 and a second end 38. As depicted, first end 36 includes an eyelet that is configured to cooperate with attachment piece 34 of camper 16. It will be appreciated that various other types of cooperating connectors may be used to perform the function described herein. For example, any type of connector(s) may be used so long as first end 36 of turnbuckle 32 is configured to attach to a cooperating attachment piece 34 on camper 16.

Similarly, second end 38 of turnbuckle 32 attaches to anchoring assembly 20 of system 18 for anchoring and/or positioning camper 16 in truck bed 14, as will be discussed in further detail hereinafter. Various other configurations of tiedown means for interconnecting camper body 16 with anchoring assembly 20 are known to those skilled in the art. For example, rather than turnbuckle 32, tie-down assembly 30 may comprise one or more chains, cables, straps, belts, or other elongated members that may be used in combinations with one or more connectors, such as but not limited to, J hoops or other shaped hoops or connectors.

Referring to FIG. 3, in one embodiment, anchoring assembly 20, includes a mounting bracket 40 and a guide plate 42. Generally, mounting bracket 40 is configured to mount between a wall 24 of truck bed 14 and cab 12 of truck 10. Guide plate 42 is configured to mount to the opposite side of wall 24 from mounting bracket 40 within truck bed 14. It will be appreciated, however, that mounting bracket 40 and guide plate 42 may be connected to various other locations of truck 10. Additionally, mounting bracket 40 and guide plate 42 need not only be mounted to truck 10 but may be used whenever an object is to be securely retained in a desired location, whether or not the desired location is associated with a vehicle.

Returning to FIG. 1, mounting bracket 40 is configured to cooperate with second end 38 of turnbuckle 32. It will be appreciated that while mounting bracket 40 is depicted in the figures as having an opening formed therein which receives second end 38 of turnbuckle 32, various other ways to interconnect turnbuckle 32 and mounting bracket 40 may also be used. What is important is that mounting bracket 40 and second end 38 of turnbuckle 32 are configured to cooperate.

Figure 4:
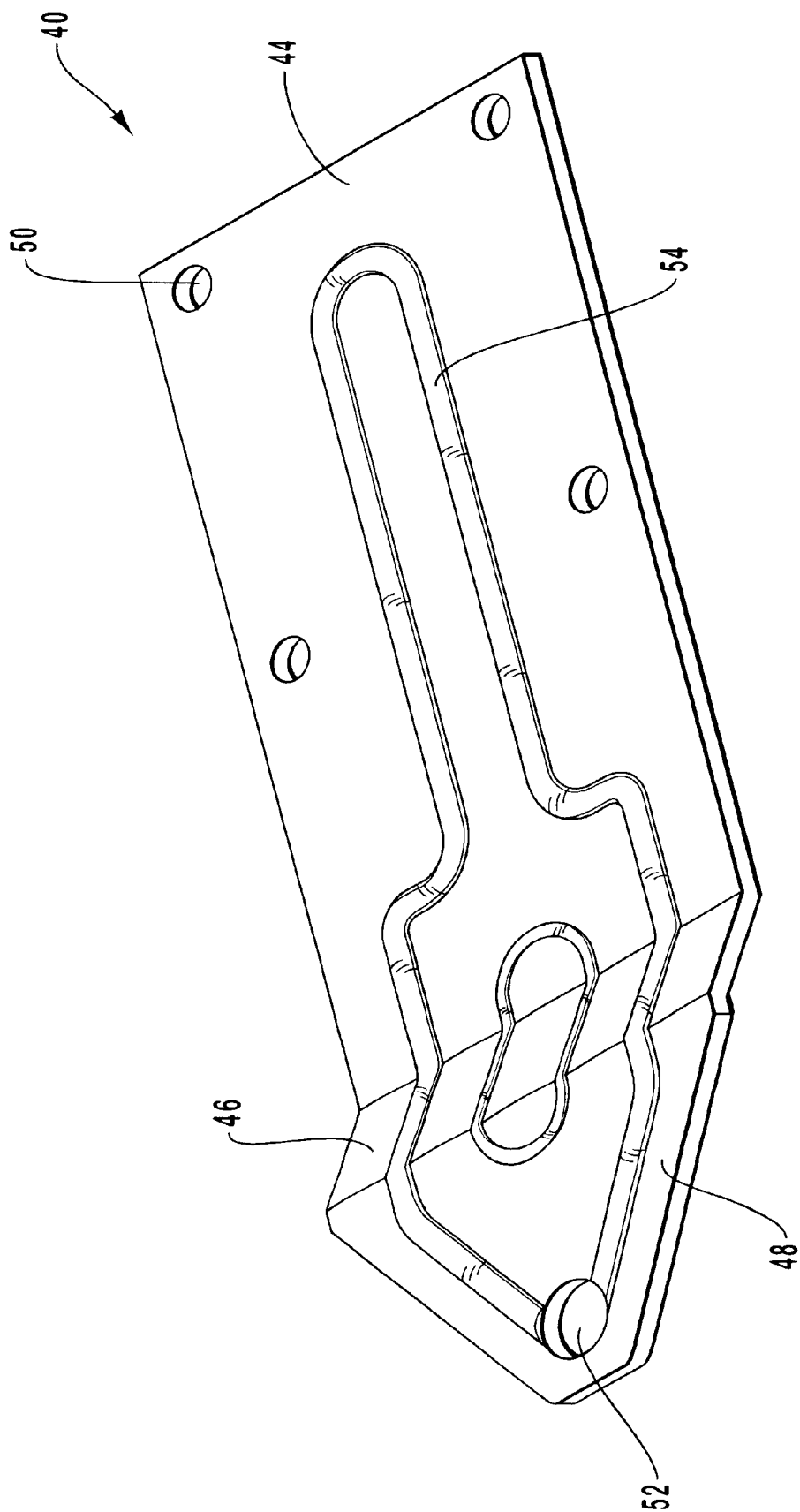
FIG. 4 is a perspective view of one embodiment of a mounting bracket in one embodiment of the anchoring assembly of the system for anchoring and/or positioning a camper within the bed of a truck of FIG. 2.

One embodiment of mounting bracket 40 is illustrated in FIG. 4. Mounting bracket 40 includes a first portion 44 separated from a second portion 48 by an angled intermediate portion 46. In this manner, first portion 44 of mounting bracket 40 is displaced from second portion 48. In other words, first portion 44 and second portion 48 of mounting bracket 40 lie in different but substantially parallel planes. It will be appreciated by one skilled in the art, however, that first and second portions 44, 48, respectively, may lie within the same plane or in planes that are angularly orientated one to another. In addition, the configuration of first portion 44 and second portion 48 of bracket 40 may be changed to accommodate the configuration of wall 24 (FIG. 2) of a particular brand and model of truck 10.

In one embodiment, first portion 44 of bracket 40 has a generally rectangular configuration. As depicted in this embodiment, first portion 44 has a plurality of optional holes 50 formed therein. Holes 50 allow mounting bracket 40 to be securely attached to a wall 24 of bed 16 and to guide plate 42, as shown in FIGS. 2 and 3. Alternatively, holes 50 could be formed while bracket 40 is actually being attached to wall 24 of truck bed 14. In other words, holes 50 in first portion 44 could be formed while attachment holes are being made in wall 24. Further, holes 50 could be drilled in bracket 40 and then bracket 40 with holes 50 be used as the template for drilling holes into wall 24 of truck bed 14. It will also be appreciated that first portion 44 of mounting bracket 40 could have various configurations other than being rectangular. For example, first portion 44 of mounting bracket 40 could be square, triangular, round, oval, elliptical, or the like.

In one embodiment, second portion 48 has a generally tapered or generally triangular configuration having a hole 52 disposed in close proximity to an apex of second portion 48. It will be appreciated that second portion 48 of mounting bracket 40 may have various other configurations such as circular, square, rectangular, elliptical, oval and the like. Further, as previously mentioned, second portion 48 may have some other configuration to interconnect with second end 48 of turnbuckle 32 instead of hole 52. By way of example and not limitation, second portion 48 may have the configuration of a book, rod, or the like which is received in a cooperating second end 48 of turnbuckle 32.

In the embodiment depicted in FIG. 4, an optional ridge 54 is formed in mounting bracket 40. In this embodiment optional ridge 54 extends from hole 52 through intermediate portion 46 and second portion 48 and returns to hole 52. Ridge 54 increases the stability and rigidity of mounting bracket 40. Ridge 54 is one embodiment of structure capable of acting as a means for strengthening the mounting bracket 40. As such, one skilled in the art will appreciate that various other configurations of structure are capable of performing the function of means for strengthening mounting bracket 40.

By way of example and not limitation, ridge 54 need not extend from first portion 44 through intermediate portion 46 and second portion 48 to return to hole 52. Instead ridge 54 may only extend from first portion 44 into intermediate portion 46. Similarly, ridge 54 may, in another alternate configuration, extend from second portion 48 and terminate within intermediate portion 46. In still another configuration, ridge 54 may extend from second portion 48 through intermediate portion 46 and terminate within first portion 44. Furthermore, the configuration, such as but not limited to size, shape, and other dimensions of ridge 54 may be varied depending on the strength required of mounting bracket 40. Additionally, the means for strengthening the mounting bracket 44 may entail attaching one or more bars, rods, or other strengthening members to mounting bracket 44. It will also be appreciated that there are some instances in which optional ridge 54 may be eliminated altogether.

In addition, it will be appreciated by one skilled in the art that mounting bracket 40 may have various other configurations. For example, the angular orientation of intermediate portion 46 relative to first portion 44 and second portion 48 may vary. Additionally, second portion 48 need not be tapered, but have a similar configuration to first portion 44. In still other configurations, first and second portions 44, 48, respectively, may have various other cross-sections and shapes. In still another configuration of mounting bracket 40, the number and configuration of holes 50 may vary, such that holes 50 may be countersunk, taped, tapered, oval, square, rectangular, round, or various other shapes or configurations depending on the particular fasteners that may pass therethrough. Similarly, the configuration of hole 52 may vary, such that hole 52 may be countersunk, taped, tapered, oval, square, rectangular, round, or various other shapes or configurations depending on the particular configuration of tie-down assembly 30.

Figure 5:
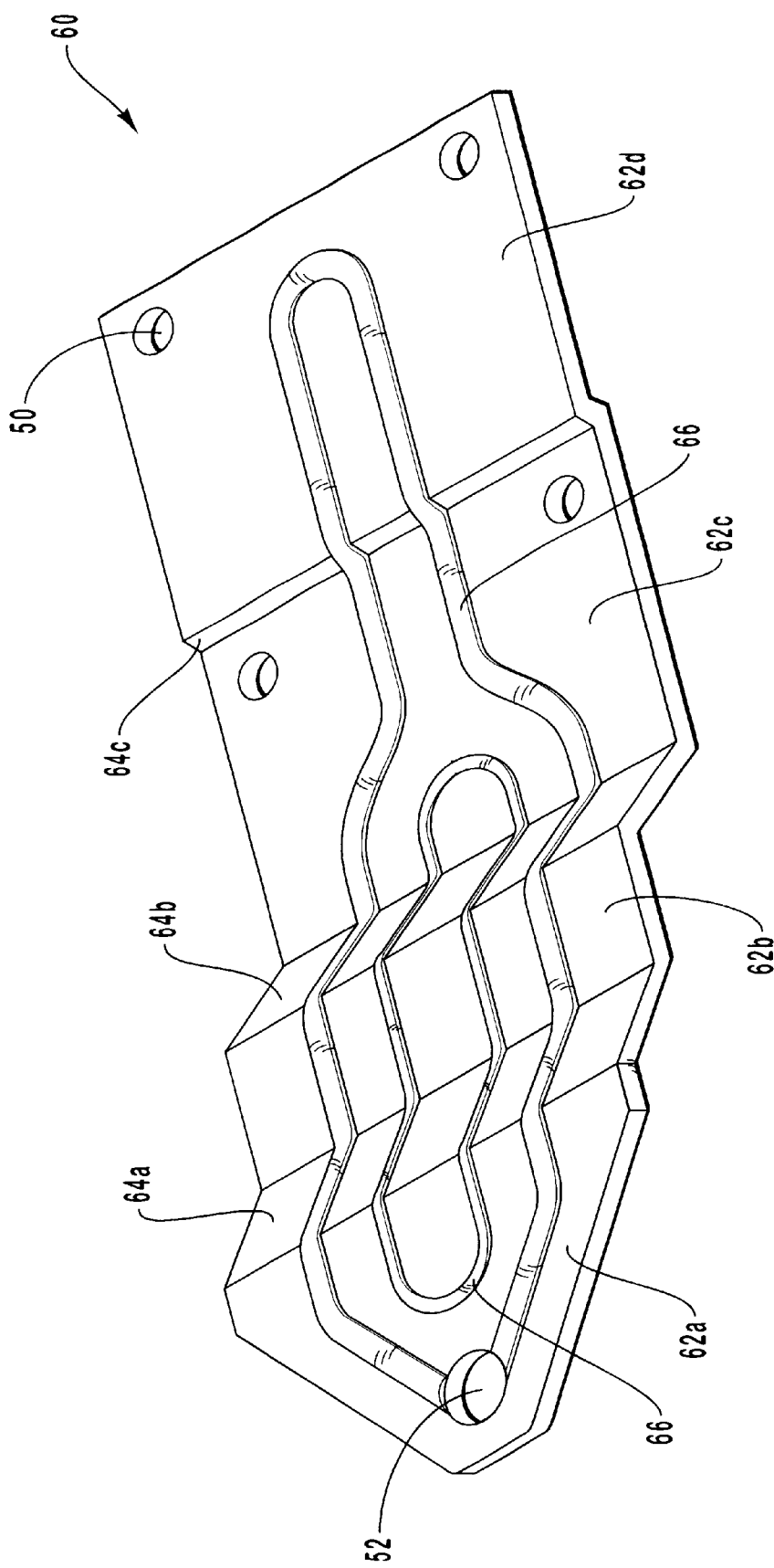
FIG. 5 is a perspective view of an alternate embodiment of a mounting bracket in one embodiment of the anchoring assembly of the system for anchoring and/or positioning a camper within the bed of a truck of FIG. 2.

FIG. 5 illustrates an alternate configuration of mounting bracket 60. Only those features that have changed in this embodiment will be discussed in detail. The features which are not effected are identified with the same reference numbers as used previously.

As shown in FIG. 5, mounting bracket 60 includes portions 62a, 62b, 62c, and 62d that lie in substantially parallel planes. Adjacent portions 62a through 62d are connected by angled portions 64a, 64b, and 64c respectively. Mounting bracket 60 includes an alternate configuration of structure capable of performing the function of means for strengthening mounting bracket 60. In this embodiment, the means for strengthening mounting bracket 60 are a plurality of ridges 66.

Alternatively, by way of example and not limitation, the means for strengthening mounting bracket 40 or 60 could be an added thickness of material on mounting bracket 40 or 60. Mounting bracket 40 or 60 could be manufactured with thickened sections or alternatively additional material could be attached to mounting bracket 40, 60 by conventional methods, including but not limited to welding a bead of material along the portion which the added strength is desired.

It may be appreciated by one skilled in the art, that mounting bracket 60 may have various other configurations. For example, the number of portions 62a–62d and 64a–64c forming mounting bracket 60 may vary as needed. In another configuration, the number of portions 62a–62d that lie in adjacent but parallel planes may vary depending on the particular needs and configuration of truck 12. In some configurations, therefore, none, some, or all of portions 62a–62d lie within parallel planes. Similarly, the number and angular orientation of angle portions 64a–64c may vary as needed. As discussed above, the number and configuration of holes 50, 52 may vary depending on the anchoring needs and configurations of tie-down assembly 30.

Mounting bracket 40, 60 may be formed from various types of material, so long as the material allows mounting bracket 40, 60 to have the requisite strength and rigidity to withstand the forces applied thereto when tie-down assembly 32 is tightened to secure camper 16 within truck bed 14 of truck 102. The types of materials used for mounting bracket 40, 60 may range from metals, composites, plastics, combinations thereof, and the like. Preferably, mounting bracket 40, 60 is made of steel.

Figure 6:
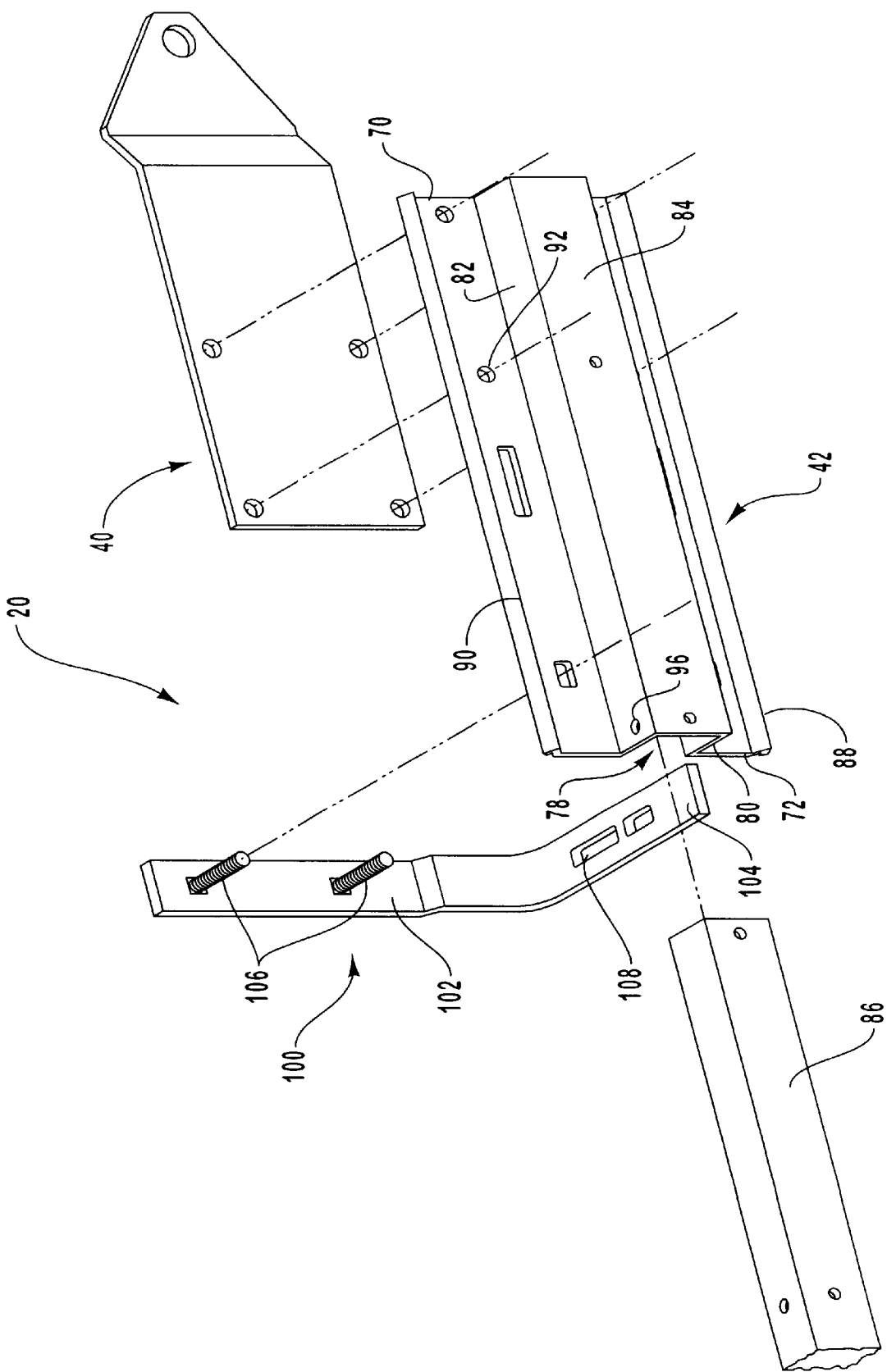
FIG. 6 is a partial exploded perspective view of one embodiment of an anchoring assembly.

Referring again to FIG. 3, mounting bracket 40 is connected through wall 24 of truck bed 14 to connect with guide plate 42. In this manner, mounting bracket 40 and guide plate 42 of anchoring assembly 20 are securely attached to wall 24 of track bed 14 of truck 12 through the use of conventional fasteners. FIG. 3 depicts one side of anchoring assembly 20. FIG. 6 shows in further detail one embodiment of anchoring assembly 20. As shown, guide plate 42 is an elongated member that has a first end 70 and a second end 72. Guide plate 42 is configured such that walls 80, 82, and 84 form a channel 78 along the longitudinal length of guide plate 42. In other words, in this embodiment, channel 78 extends generally along the longitudinal axis of guide plate 42 from first end 70 to second end 72.

Anchoring assembly 20 also includes a stabilizing bar 86. As illustrated, stabilizing bar 86 is an elongated member and in one embodiment has a rectangular cross-section. Stabilizing bar 86 is configured to be received in channel 78 of guide plate 42. In one embodiment of channel 78 in guide plate 42, illustrated in FIG. 6, channel 78 has a substantially rectangular cross section. It will be appreciated, however, that channel 78 and stabilizing bar 86 may have various other cross-sectional configurations. Generally, channel 78 is configured to receive a stabilizing bar 86 therein. Channel 78 and stabilizing bar 86 may, therefore, have various other configurations known to one skilled in the art so long as channel 78 is capable of having stabilizing bar 86 slidably disposed within channel 78.

In one embodiment, guide plate 42 has optional ridges 88 and 90 formed along the longitudinal edges thereof. As illustrated, ridges 88, 90 extend from first end 70 to second end 72. Ridges 88, 90 provide strength to guide plate 42 by increasing the effective thickness thereof Ridges 88, 90 function in substantially the same manner as ridges 54, 66 of mounting bracket 40, 60, respectively, in that ridges 88, 90 increase the rigidity of guide plate 42. It will be appreciated by one skilled in the art, that in guide plate 42 ridges 88, 90 may have various other configurations so long as they are capable of providing structural strength to guide plate 42. In addition, the walls 80, 82, and 84 of guide plate 42 which define channel 78 may also have one or more ridges 88, 90 formed thereon.

As illustrated in FIG. 6, guide plate 42 may have a plurality of holes 92 formed therein. Holes 92 allow guide plate 42 to connect with mounting plate 40 through wall 24 (FIG. 3) of truck bed 14 of truck 12 by way of conventional fasteners including but not limited to bolts and nuts. It will be appreciated that various other types of fasteners may be used. It will also be appreciated by one skilled in the art that holes 92 could alternatively be formed, such as by drilling, at the time attachment assembly 20 is being mounted to truck 10.

Walls 80, 82, or 84, may also have one or more optional apertures 96 that are configured to receive fasteners therein to securely retain stabilizing bar 86 within channel 78. Generally, apertures 96 may have a variety of configurations so long as they are capable of allowing the fasteners to engage with stabilizing bar 86.

Anchoring assembly 20 also includes support bracket 100. In one embodiment illustrated in FIG. 6, support bracket 100 has a generally L-shaped configuration. Support bracket 100 comprises a first leg 102 and a second leg 104. In one embodiment, first leg 102 of support bracket 100 includes optional threaded protrusions 106 that extend therefrom and are configured to be disposed through guide plate 42. As depicted, in this embodiment threaded protrusions 106 are spaced apart one from another a sufficient distance so that upon mounting support bracket 100 to guide plate 42, each of one protrusion 106 extends through a hole 92 on opposite sides of channel 78. In this manner, support bracket 100 can be secured to guide plate 42 using conventional fasteners.

Figure 7:
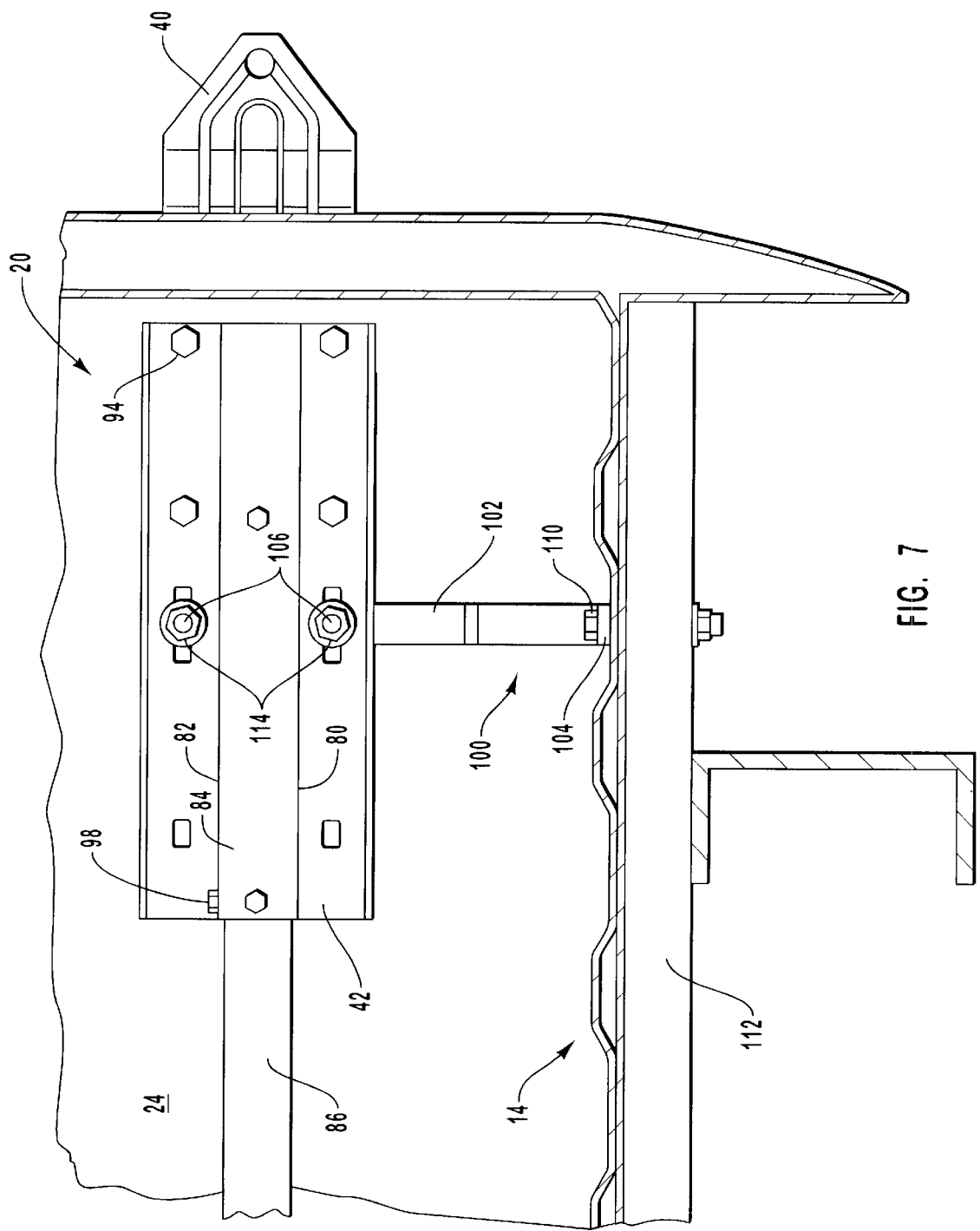
FIG. 7 is partial cross-sectional elevation view of one embodiment of an anchoring assembly attached to a truck.

Second leg 104 of support bracket 100 is configured to be disposed along the bottom of truck bed 14 of truck 10. Second leg 104 of support bracket 100 has an optional aperture 108 formed therein. Conventional fasteners may be used to securely attach support bracket 100 to truck bed 14 of truck 10. By way of example and not limitation, aperture 108 is adapted to receive a fastener that mounts support bracket 100 to truck bed 14 of truck 10. More specifically, as shown in FIG. 7, fastener 110 passes through aperture 108 (FIG. 6) of second leg 104 of support bracket 100 secure support bracket 100 to a frame member 112 of truck 10.

It will be appreciated by one skilled in the art that support bracket 100 may have various other configurations. For example, in an alternate embodiment, threaded protrusions 106 in first leg of support bracket 100 may be eliminated. Instead, first leg may optionally include one or more holes formed therethrough that accommodate a corresponding fastener. It will be appreciated that although FIGS. 6 and 7 depict only one support bracket 100, various other numbers of support brackets may be utilized in anchoring assembly 20.

Generally, guide plate 42, stabilizing bar 86, and support bracket 100 may be fabricated from various types of materials so long as they provide the requisite strength and rigidity required, in light of the teaching contained herein. For example, guide plate 42 and support bracket 100 maybe formed from various materials such as metals, plastics, composites, combinations thereof, and the like. In one embodiment that is presently preferred, guide plate 42 and support bracket 100 are formed from steel. Similarly, stabilizing bar 86 may be formed from various tubular members, or solid members formed from various materials, such as metal, plastics, composites, and the like. In one embodiment which is presently preferred, stabilizing bar 86 is formed from a tubular steel member.

Referring again to FIG. 7, anchoring assembly 20 is shown as being mounted to truck bed 14 of truck 10. During installation of anchoring assembly 20 using one embodiment of support bracket 100, threaded protrusions 106 engage guide plate 42 and are securely retained by way of one or more nuts 114 or other fasteners. Upon attachment of support bracket 100 to guide plate 42, stabilizing bar 86 is disposed within channel 78 in guide plate 42 and may be secured therein by fasteners 98.

Guide plate 42 is mounted on wall 24 of truck bed 14 of truck 10 and is secured thereon by fasteners 94 which are disposed in holes in wall 24 and in mounting bracket 40 (FIGS. 4, 5). In this manner one-half of anchoring assembly 20 is installed on truck 12. Subsequent to connecting guide plate 42 to mounting bracket 40, a fastener 110 anchors support bracket 100 to frame member 112. A similar operation may be performed on the opposite side of truck bed 14 to thereby mount another mounting bracket 40 and another guide plate 42 to complete one embodiment of anchoring assembly 20.

It will be appreciated that one skilled in the art may identify various other methods of installing anchoring assembly 20 to truck 10. For example, stabilizing bar 86 may be located within channel 78 of guide plate 42 once mounting bracket 40, guide plate 42, and support bracket 100 have been mounted to truck 10. In another configuration, support bracket 100 may be first attached to truck bed 14 of truck 10 and subsequently guide plate 42 attached thereto.

Returning to FIG. 2, illustrative embodiments of positioning assemblies 22 are depicted. In one embodiment shown in this figure, positioning assemblies 22 include a rear assembly 120 and a front assembly 122. Rear assembly 120, in one embodiment, includes two rollers 121 mounted to truck bed 14 of truck 10 by way of two locking assemblies which will be discussed in further detail relative to FIGS. 8 and 9. In FIG. 2, truck bed 14 of truck 10 is depicted as having a fluted configuration. In other words, truck bed 14 has a plurality of raised portions 116 with adjacent raised portions 116 being separated by a groove 118. It will be appreciated that truck bed 14 may have various other configurations.

Rollers 121 of rear assembly 120 are removably mounted to truck bed 14. As shown in FIG. 2, rollers 121 of rear assembly 120 arc separated one from another to allow the base 24 of camper 16 to slide there between, while maintaining sufficient force on base 26 of camper 16 to prevent lateral movement of camper 16 during use. One skilled in the art will appreciate that rear assembly 120 of positioning assembly 22 may include more than two rollers 121. Consequently, a plurality of rollers 121 may be mounted in truck bed 14. For example, a plurality of rollers 121 may be used that arc equidistantly spaced along and offset from the central axis of truck bed 14 to thereby support and prevent lateral movement of camper 16 along the entire length of the base 26 of camper 16. In another configuration, two or more rollers are mounted side-by-side at tie location where each roller 121 is depicted in FIG. 2.

Referring now to FIGS. 8 and 9, more detailed representations of one embodiment of rear assembly 120 and locking assembly 150 is shown. In these figures, rollers 121 are shown in a disengaged and mounted position. Only locking assembly 150 and one roller 121 are illustrated in each figure. It will be appreciated, however, that this discussion is applicable for any number of locking assemblies 150 and rollers 121 in rear assembly 120 of positioning assembly 22 that may be mounted in truck bed 14.

As illustrated in FIG. 8, in one embodiment roller 121 comprises a roller body 130 and a fixed body 132. An optional washer 168 may be disposed therebetween. In this illustrative configuration, roller body 130 has a generally cylindrical configuration with a first end 134 and a second end 136. As depicted, first end 134 of roller body 130 is tapered to allow roller 121 to guide camper 16 as camper 16 is being disposed in truck bed 14. As discussed previously, typical positioning devices guide campers that are slid within the bed of the truck, while providing little assistance with positioning campers that are lowered into the bed of the truck. In contrast, tapered first end 134 of roller body 130 of roller 121 assists with installation of campers that are either slid or lowered into truck bed 14 of truck 10. In other words, as camper 16 is lowered toward or slid within truck bed 14, base 26 of camper 16 engages with roller 121 of rear assembly 122. As camper 16 engages first end 134 of roller body 130, the angular orientation of the taper directs camper 16 between rollers 121, thereby directing camper 16 into the desired location within truck bed 14. Accordingly, base 26 of camper 16 slides along tapered first end 134 to be located between two adjacent rollers 121.

It will be appreciated by one skilled in the art that first end 134 and second end 136 of roller body 130 may have various other configurations. The shape of first end 134 is intended to assist in guiding base 26 of camper 16 as it is loaded into truck bed 14 of truck 10. Other configurations are capable of performing this function. By way of example and not limitation first end 134 of roller body 130 may be spherical, elliptical, ovular or the like as long as first end 134 directs the positioning of camper 16 as it is being loaded on to truck 10. Similarly, second end 136 of roller body 130 may have other configurations than concave. What is important is that second end 136 of roller body 130 be configured to cooperate with fixed body 132. Further, in one embodiment, second end 136 of roller body 130 and fixed body 132 are configured to be in rotatable engagement. This allows roller body 130 to rotate as first end 134 is directing camper 16 into the desired location.

FIG. 8 also illustrates one embodiment of rollers 121 and locking assembly 150. Generally, roller 121 is configured to cooperate with and be held in place by locking assembly 150. More specifically, extending between first end 134 and second end 136 of roller body 130 is a bore 138 that is configured to receive a bushing 148. In one embodiment bore 138 has a first end 139 that is correspondingly tapered to receive a head 165 of a fastener 164. Fastener 164 extends through the longitudinal axis of bore 138 and bushing 148 to securely attach roller body 130 to truck bed 14 of truck 10. As is most clearly shown in FIG. 9, tapered first end 139 of bore 138 allows head 165 of fastener 164 to be substantially flush with the top of roller body 130. This is advantageous when using first end 134 of roller body 130 to direct the base of camper 16 into the desired position in truck bed 14 of truck 10. This design of locking assembly 122 reduces the possibility of head 165 hooking up on base 26 of camper 16 as it is being loaded onto truck 10. It will be appreciated that various other configurations of fastener 165 and roller body 130 with bore 138 may be utilized.

Similarly, it will be appreciated that first end 139 of bore 138 may have various configurations as long as it is capable of receiving head 165 of fastener 164 therein. Alternatively, head 165 of fastener 164 may be on top of first end 134 of roller body 130. Various configurations of head 165 of fastener 164 may be utilized to minimize any chance that head 165 will interfere with camper 16.

One skilled in the art, in light of the teaching contained herein, may identify various other configurations of roller body 130 that are capable of performing the desired function. For example, the angular orientation of tapered first end 134 may be varied depending on the particular application. Similarly, bore 138 need not have a tapered first end 139, but may have any configuration of first end 138 as desired which cooperates with head 165 of fastener 164. In another configuration of roller body 130, both first end and second end 134, 136, respectively, have tapered configurations. In still another configuration, second end 136 is generally planar.

As previously mentioned fixed body 132 of rollers 121 engages roller body 130. More specifically, second end 136 of roller body 130 rotatably engages with fixed body 132. Fixed body 132 has a generally cylindrical or disc-like configuration having an upper surface 140 and a lower surface 142. Disposed through fixed body 132 between upper surface 140 and lower surface 142 is a bore 146. In this embodiment, upper surface 140 has a complementary engaging portion 144 that has a tapered configuration configured to engage with concaved second end 136 of roller body 130. The particular configuration of engaging portion 144, therefore, is linked to the configuration of second end 136 of roller body 130 and may vary so long as roller body 130 is allowed to rotatably engage with fixed body 132.

It will be appreciated that various other configurations of second end 136 of roller body 130 and engaging portion 144 may be used. For example, in an alternate configuration, fixed body 132 is devoid of engaging portion 144 and instead has a planar upper surface 140, while second end 136 of roller body 130 has a corresponding generally planar configuration. In another configuration, engaging portion 144 of fixed body 132 may have a concaved configuration and second end 136 of roller body 130 may be tapered rather than concave. Further, engaging portion 44 of fixed body 132 may be semispherical and second end 136 of roller body is correspondingly shaped to receive engaging portion 144 therein.

In light of the teaching contained herein, one skilled in the art may identify various other configurations of fixed body 132. For example, the particular configuration of engaging portion 144 may vary based upon the particular configuration of second end 136 of roller body 130. Similarly, the particular configuration of fixed body 132 may vary, such that fixed body 132 is not disk-like but may have various cross-sectional configurations.

Releasably attaching roller 121 to truck bed 14 of truck 10 is locking assembly 150. Locking assembly 150 allows roller 121, and more specifically roller body 130 and fixed body 132, to be securely attached to truck bed 14 of truck 10 by way of fastener 164, while reducing the problems associated with releasably attaching roller 121 to truck bed 14 of truck 10. In addition to fastener 164, locking assembly 150, in one embodiment, includes a locking bolt 152, an optional washer 154, and a nut 156. In one embodiment, locking bolt 152 has a recessed first end 158 and a threaded second end 160. Disposed through and along the longitudinal axis of locking bolt 152 from recessed first end 158 to threaded second end 160 is a threaded hole 162 adapted to threadably receive fastener 164. Recessed first end 158 is configured to receive head 165 of fastener 164 when fastener 164 is to be stored within threaded hole 162 upon the removal of roller body 130 and fixed body 132. Recessed first end 158, therefore, retains head 165 of fastener 164 and prevents fastener 164 from impairing the usability of truck bed 14 when camper 16 is removed from truck 10.

It may be appreciated by one skilled in the art that locking assembly 150 may have various other configurations as may be identified by one skilled in the art in light of the teaching contained herein. For example, recessed first end 158 of bolt 152 may have various other configurations depending upon the type of fastener 164 that is to be located within threaded hole 162. In one alternate configuration, therefore, first end 158 of bolt 152 is not recessed, but has a convex or other configuration. Threaded second end 160 may also have various configurations so long as the threads formed on second end 160 cooperate with those threads formed in nut 156. Alternatively, second end 160 may be devoid of threads and be releasably or fixably attached to nut 156 or another locking member by some other manner, such as but not limited to friction fit, slip fit, welds, adhesives, and the like. In another configuration of the present invention, locking assembly 150 need not be used with positioning assemblies 122, but may be used in any situation were a fastener is to be fixably or releasably mounted to a structure. For example, locking assembly 150 may be used to releasably mount a fastener to camper 16, to wall 24 or sides of truck bed 14, within a fixed structure such as a house, shed, garage, and the like, or in a variety of other locations as may be known to one skilled in the art.

Referring now to FIG. 9, roller 121 is depicted mounted to truck bed 14 of truck 10. To mount roller 121 to truck bed 14 of truck 10 a hole 166 (FIG. 8) has been formed in truck bed 14 of truck 10. In one embodiment, hole 166 is preferably spaced apart from the longitudinal axis of truck bed 14 a distance equal to approximately half the width of base 26 of camper 16. As depicted in FIG. 9, locking nut 156 is inserted into hole 166 and is locked in place by way of optional washer 154 and nut 156.

Fixed body 132 is now mounted on locking bolt 152 such that bore 146 is aligned with threaded hole 158 of locking bolt 152. An optional washer 168 is inserted between fixed body 132 and roller body 130 of roller 121 to separate roller body 130 and fixed body 132 and aid with the rotational motion of roller body 130. Subsequently, optional bushing 148 is inserted within bore 138 of roller body 130, so that as bore 138 of roller body 130 is aligned with bore 146 of fixed body 132 and threaded hole 162 of locking bolt 152. Bushing 148 rests upon fixed body 132 or optional washer 168. To securely retain roller body 130 and fixed body 132 to truck bed 14 of truck 10, fastener 164, passes along the interior of bushing 148 and bore 146 of fixed body 132 to threadably engage with threaded hole 162 of locking bolt 152. Consequently, head 165 of fastener 164 is mounted within first end 139 of bore 138. In this manner, fastener 164 releasably mounts roller 121 to bed 14 of truck 10, while allowing roller body 130 to rotate about bushing 148. As such, roller body 130 may rotate during installation and removal of camper 16, thereby assisting to guide camper 16 and preventing damage to camper 16.

To remove roller 121 the above describe method may be followed in the reverse order. According to another aspect of the present invention, the configuration of locking assembly 150 is such that upon removal of fastener 164, roller body 130, and fixed body 132, locking assembly 150 may remain attached to truck bed 14 without substantially impairing the usability of truck bed 14 when camper 16 is removed. More specifically, when locking assembly 150 is attached in groove 118 of truck bed 14, locking bolt 152 is configured to substantially remain below raised portions 116 of truck bed 14. Therefore, locking bolt 152 does not extend upwardly a greater height so that is might catch or snag objects that are to be placed within truck bed 14 of truck 10.

It may be appreciated that one skilled in the art may identify various other configurations of roller 121, and the associated methods of installing and removing roller 121 from truck bed 14 of truck 10. For example, in an alternate configuration, bore 138 is devoid of a tapered end 139, and bushing 148 includes a tapered first end that is capable of receiving fastener 164. In another configuration, roller 124 need not be configured to allow roller 130 to rotate. Therefore, another configuration of roller 124 includes a solid, elongated fixed body, which includes a tapered first end to aid in positioning of a camper within a truck bed. Further, an alternate embodiment of fastener 164 may have threads formed on the entire length thereof. In this case even if roller 124 is removed, fastener 164 may be reinstalled in locking bolt 152 and remain in place as part of locking assembly 150 until such time as it is removed to install roller 124.

Figure 10:
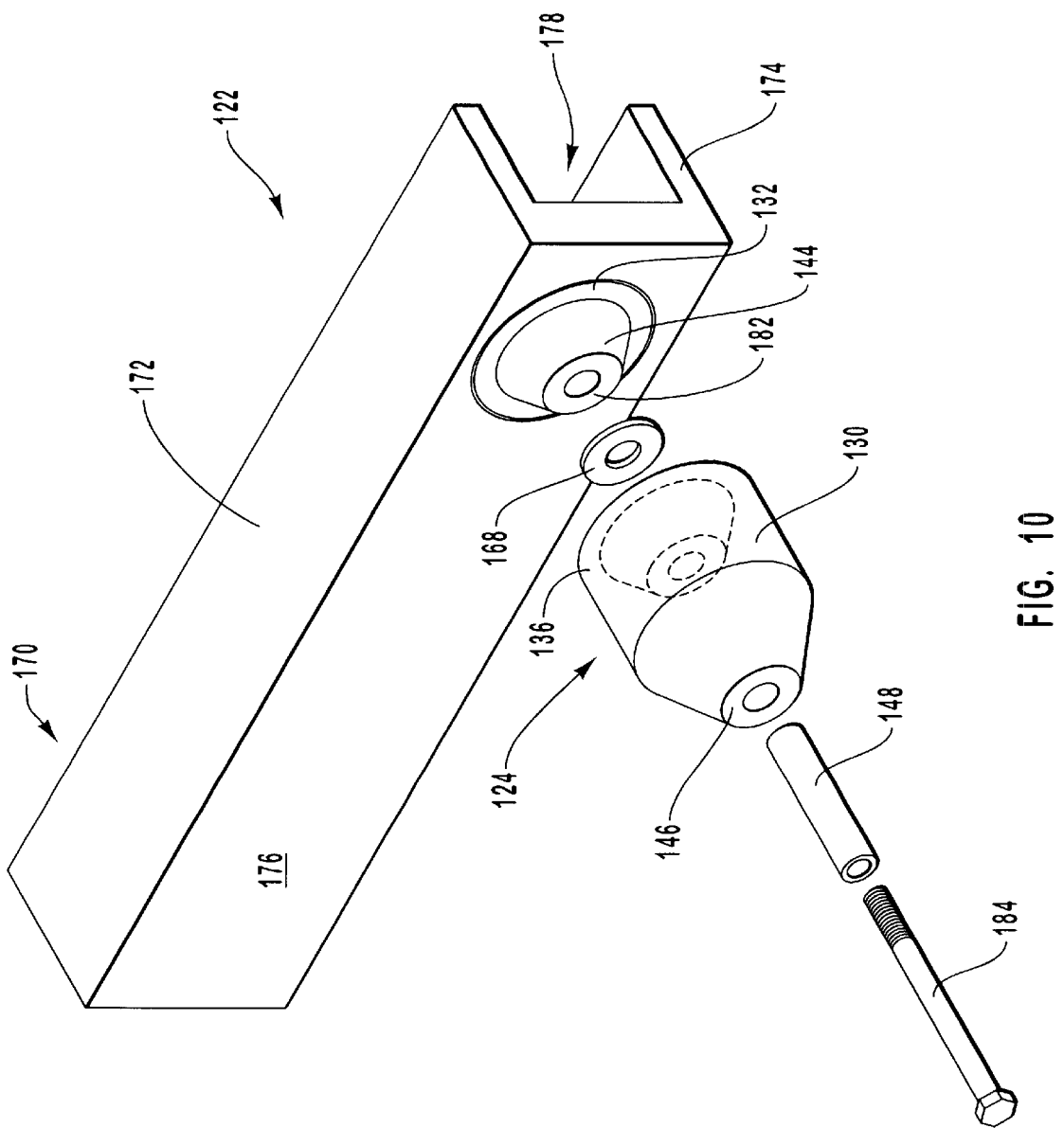
FIG. 10 is an exploded perspective view of one embodiment of a front roller assembly in one embodiment of a positioning assembly.

Referring again to FIGS. 2 and 3, mounted to guide plates 42, or optionally stabilizing bar 86, is a front assembly 122 of positioning assemblies 22. Front assembly 122 both limits the distance that camper 16 may be inserted within truck bed 14 of truck 10 and assists with the prevention of lateral movement of camper 16 when installed in truck bed 14. Turning now to FIG. 10, a more detailed representation of front assembly 122 of positioning assemblies 22 is illustrated. As shown, front assembly 122 includes a bumper bracket 170 and roller 124. Roller 124 has a similar configuration as roller 121. Accordingly only those features that differ will be discussed in detail. Roller 124 comprises roller body 130 and fixed body 132. Bumper bracket 170 has a C-channel configuration configured to form a recess 178 which receives walls 80, 82, 84 (FIG. 6) of guide plate 42 therein. Alternatively, recess 178 may be configured to receive stabilizing bar 86. As such, the configuration of bracket 170 may vary depending on the particular configuration of guide plate 42 or optionally stabilizing bar 86. Bumper bracket 170 limits the distance camper 16 is inserted into truck bed 14.

In front assembly 122, fixed body 132 is attached to wall 176 of bumper bracket 170. Fixed body 132 includes engaging portion 144 that is configured to cooperate with a similarly configured second end 136 of roller body 130. In this embodiment engaging portion 144 has a bore 182 formed therein that aligns with an opening (not shown) formed in wall 176 of bracket 170. Accordingly bore 182 is in communication with recess 178.

In installation, a self-taping fastener, such as bolt 184 passes through bushing 148 that is inserted within bore 146 of roller body 130. Self-tapping fastener 184 subsequently passes through optional washer 168, and bore 182 in fixed body 132, hole in wall 176 of bracket 170 to engage with a hole formed in guide plate 42 or alternatively stabilizing bar 86. In this manner, front assembly 122 of positioning assemblies 22 may be mounted to anchoring assembly 20.

It may be appreciated by one skilled in the art, that positioning assembly 22 and its associated assemblies and elements may have various other configurations as understood by one skilled in the art in view of the teaching contained herein. For example, the configurations of roller body 130, fixed body 132, and bumper bracket 170, may vary depending on the particular configuration and needs of roller assembly 120.

Generally, roller body 130, fixed body 132, and bumper bracket 170 are fabricated from a plastic type material. Other materials may be used to fabricate or form such elements, for example, metals, composites, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for anchoring and positioning a camper within a bed of a truck defined by a bottom wall and a plurality of side walls extending substantially upward therefrom, the truck having a load bearing frame member, said system comprising:

(a) an anchoring assembly adapted to attach to the load bearing frame member of the truck through the bed of the truck, said anchoring assembly comprising a mounting bracket attached to an outside surface of one of the side walls of the bed of the truck; and (b) tie-down means for interconnecting the camper with said anchoring assembly.

2. A system as recited in claim 1, wherein said anchoring assembly further comprises a guide plate coupled to the bed of the truck, said guide plate being configured to receive a stabilizing bar.

3. A system as recited in claim 1, wherein said mounting bracket is attached outside of the bed of the truck, said mounting bracket being configured to cooperatively engage with said tie-down means.

4. A system for anchoring and positioning a camper within a bed of a truck, the truck having a load bearing frame member, said system comprising:

(a) an anchoring assembly adapted to attach to the load bearing frame member of the truck through the bed of the truck;

(b) a positioning assembly attached to said anchoring assembly, said positioning assembly being configured to guide the camper within the bed of the truck during installation of the camper; and (c) tie-down means for interconnecting the camper with said anchoring assembly.

5. A system as recited in claim 4, wherein said anchoring assembly comprises a guide plate coupled to the bed of the truck, said guide plate having a channel formed therein.

6. A system as recited in claim 5, wherein said anchoring assembly further comprises a stabilizing bar configured to be disposed in said channel in said guide plate.

7. A system as recited in claim 5, wherein said anchoring assembly further comprises a mounting bracket coupled to the bed of the truck, said mounting bracket extending outside said bed of said truck, said mounting bracket being configured to cooperatively engage with said tie-down means.

8. A system as recited in claim 4, wherein said anchoring assembly comprises:
   (a) a mounting bracket attached to the bed of the truck;
   (b) a guide plate coupled to said mounting bracket; and
   (c) a support bracket coupled to said load bearing frame member of the truck.

9. A system as recited in claim 4, wherein said positioning assembly is configured to prevent lateral motion of the camper.

10. A system as recited in claim 4, wherein said positioning assembly comprises a front roller assembly attached to said anchoring assembly.

11. A system as recited in claim 10, wherein said front roller assembly comprises a bracket and a roller body.

12. A system as recited in claim 10, wherein said positioning assembly further comprises a locking assembly, said locking assembly being configured to removably couple said rear roller assembly to the bed of the truck.

13. A system as recited in claim 10, wherein said tie-down means comprises a turnbuckle.

14. A system for anchoring and positioning a camper within a bed of a truck having a load bearing frame member, said system comprising:
   (a) an anchoring assembly adapted to be attached to the load bearing frame member of the truck, said anchoring assembly comprising:
      (i) a mounting bracket attached to the outside surface of the bed of the truck, said mounting bracket extending beyond the bed of the truck;
      (ii) a guide plate attached to said mounting bracket; and
      (iii) a stabilizing bar configured to be received in said guide plate;
   (b) a positioning assembly attached to said anchoring assembly, said positioning assembly being configured to guide the camper within the bed of the truck during installation and prevent lateral movement of the camper after installation of the camper in the bed of the truck; and
   (c) a tie-down assembly configured to interconnect the camper with said anchoring assembly.

15. A system as recited in claim 14, wherein said anchoring assembly further comprises a support bracket coupled to said guide plate and the load bearing frame member of the truck.

16. A system as recited in claim 14, wherein said mounting bracket comprises means for strengthening said mounting bracket.

17. A system as recited in claim 16, wherein said means for strengthening said mounting bracket comprises a ridge formed in said mounting bracket.

18. A system as recited in claim 14, wherein said guide plate has a channel formed therein.

19. A system as recited in claim 18, wherein said stabilizing bar is configured to be slidably disposed in said channel.

20. A system as recited in claim 14, wherein said positioning assembly comprises:
   (a) a front roller assembly attached to said anchoring assembly; and
   (b) a rear roller assembly mounted to the bed of the truck.

21. A system as recited in claim 20, wherein said rear roller assembly comprises:
   (a) a roller body comprising a first end and a second end;
   (b) a fixed body comprising an upper surface and a lower surface, said upper surface of said fixed body being configured to cooperate with said second end of said roller body.

22. A system as recited in claim 21, wherein:
   (a) said second end of said roller body is had a generally concaved configuration; and
   (b) said upper surface of said fixed boy has a protrusion that is configured to rotatably engage with said concaved second end of said roller body.

23. A system as recited in claim 21, wherein said roller body and said fixed body comprise complementary bores, said roller body being configured to rotate, with respect to fixed body, about a longitudinal axes of said complementary bores.

24. A system as recited in claim 20, wherein said positioning assembly further comprises a locking assembly, said locking assembly being configured to removably couple said rear roller assembly to the bed of the truck.

25. A system as recited in claim 24, wherein said locking assembly comprises:
   (a) a locking bolt comprising a hole disposed along the longitudinal axis of said locking bolt; and
   (b) a locking nut.

26. A system for anchoring and positioning a camper within a bed of a truck having a load bearing frame member, said system comprising:
   (a) an anchoring assembly adapted to be attached to the truck, said anchoring assembly comprising:
      (i) a mounting bracket attached to the bed of the truck;
      (ii) a guide plate coupled to said mounting bracket, said guide plate having a channel formed therein; and
      (iii) a stabilizing bar configured to be disposed in said channel formed in said guide plate;
   (b) a positioning assembly coupled to said anchoring assembly, said positioning assembly comprising a front roller assembly coupled to said anchoring assembly, said front roller assembly comprising a roller and a bumper bracket; and
   (c) a tie-down assembly configured to interconnect the camper with said anchoring assembly.

27. A system as recited in claim 26, wherein said anchoring assembly further comprises a support bracket attached to said guide plate, said support bracket being configured such that it is also coupled to the load bearing frame member of the truck through the bed of the truck.

28. A system as recited in claim 26, wherein said positioning assembly further comprises a rear roller assembly coupled to the bed of the truck, said rear roller assembly being configured to guide the camper within the bed of the truck during installation of the camper.

29. A system as recited in claim 28, wherein said rear roller assembly comprises at least one rear roller.

30. A system as recited in claim 29, wherein said at least one rear roller comprises a rear roller body and a rear fixed body.

31. A system as recited in claim 30, wherein said rear roller body comprises a tapered first end and a concave second end, said rear roller body having a bore formed between said first end and said second end.

32. A system as recited in claim 31, wherein said rear roller assembly further comprises a locking assembly configured to be mountable to the bed of the truck, said locking assembly comprising a locking bolt configured with a hole disposed along the longitudinal length thereof.

33. A system as recited in claim 32, wherein said rear roller assembly further comprises a fastener disposed within said bore and configured to be engage with said threaded hole of said locking bolt to releasably attach said rear roller body to said fixed body and the bed of the truck.

34. A system for anchoring and positioning a camper within a bed of a truck, the truck having a load bearing frame member, said system comprising:
  (a) an anchoring assembly adapted to attach to the load bearing frame member of the truck through the bed of the truck;
  (b) a positioning assembly attached to said anchoring assembly, said positioning assembly being configured to guide the camper within the bed of the truck during installation of the camper, said positioning assembly comprising:
    a front roller assembly attached to said anchoring assembly; and
    a rear roller assembly mounted to the bed of the truck; and
  (c) tie-down means for interconnecting the camper with said anchoring assembly.

35. A system for anchoring and positioning a camper within a bed of a truck, the truck having a load bearing frame member, said system comprising:
  (a) an anchoring assembly adapted to attach to the load bearing member of the truck through the bed of the truck;
  (b) a rear roller assembly mounted on the bed of the truck to guide the camper within the bed of the truck during installation of the camper; and
  (c) tie-down means for interconnecting the camper with said anchoring assembly.

* * * * *

UNITED STATES PATENT AND TRADEMARK OFFICE
CERTIFICATE OF CORRECTION

PATENT NO. : 6,547,314 B1
DATED : April 15, 2003
INVENTOR(S) : C. Martin Rasmussen It is certified that error appears in the above-identified patent and that said Letters Patent is hereby corrected as shown below:

Column 1,
Line 34, before "normal" insert -- the --

Column 5,
Line 34, before "depict: change "drawing" to -- drawings --

Column 7,
Line 66, after "50" insert -- could --

Column 8,
Line 16, after "configuration of a" change "book," to -- hook, --

Column 10,
Line 9, after "thereof" insert a period

Column 11,
Line 62, before "separated" change "arc" to -- are --

Column 12,
Line 3, before "equidistantly" change "arc" to -- are --
Line 7, before "location" change "tie" to -- the --

Column 14,
Line 34, after "situation" change "were" to -- where --

Column 15,
Line 4, before "method" change "describe" to -- described --
Line 41, before "Turning" start a new paragraph Column 18,
Line 7, after "body" change "is had" to -- has --

UNITED STATES PATENT AND TRADEMARK OFFICE
CERTIFICATE OF CORRECTION

PATENT NO.    : 6,547,314 B1
DATED         : April 15, 2003
INVENTOR(S)   : C. Martin Rasmussen It is certified that error appears in the above-identified patent and that said Letters Patent is hereby corrected as shown below:

Column 19,
Line 3, before "with said" change "engage" to -- engaged --

Signed and Sealed this

Twenty-sixth Day of August, 2003

JAMES E. ROGAN
*Director of the United States Patent and Trademark Office*